May 30, 1967  A. C. BIGGS  3,322,447
STIFFENING-BAR MOUNTING FOR METAL WALL STUDS
Filed April 7, 1964
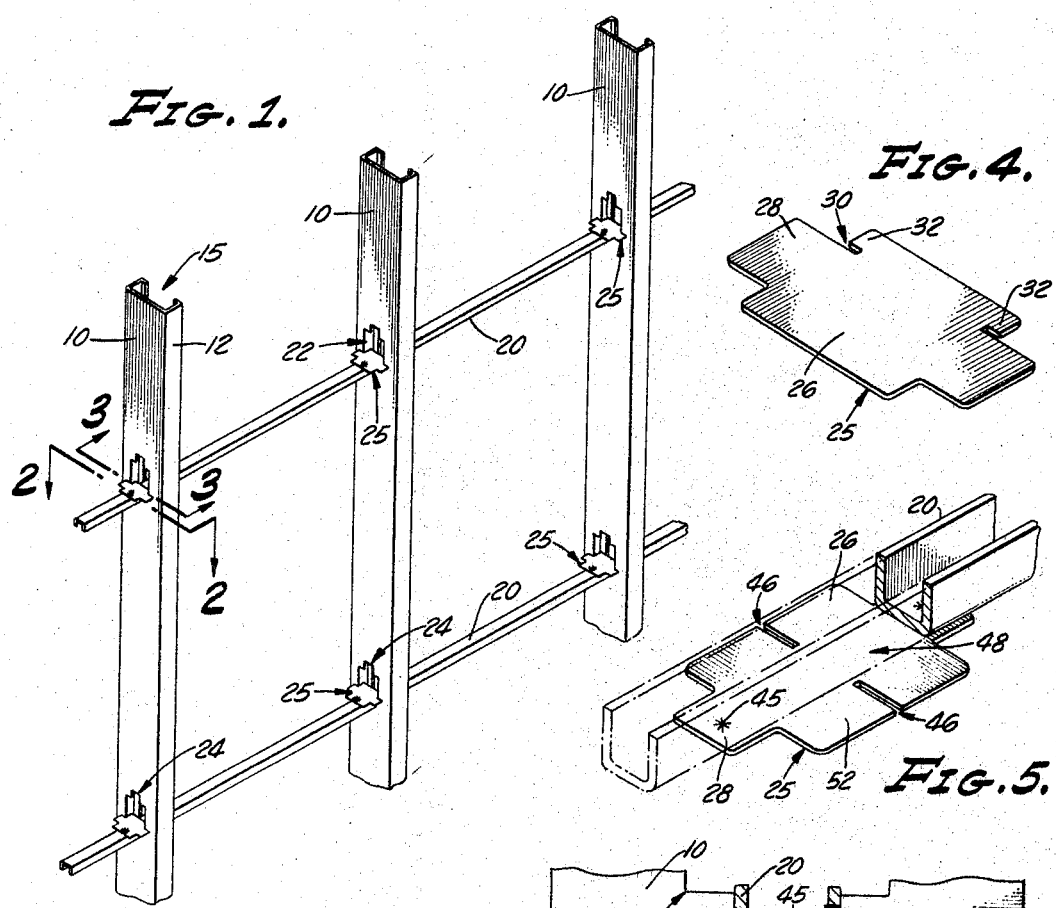
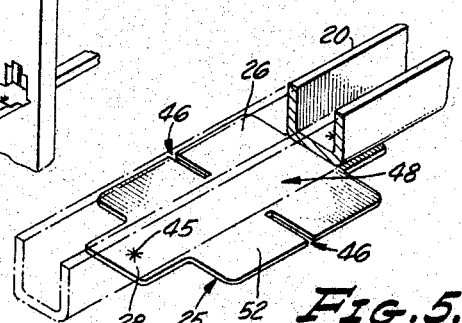
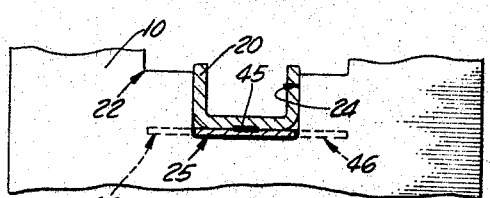
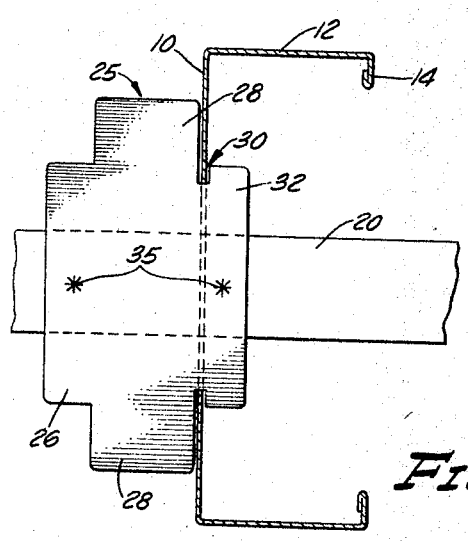
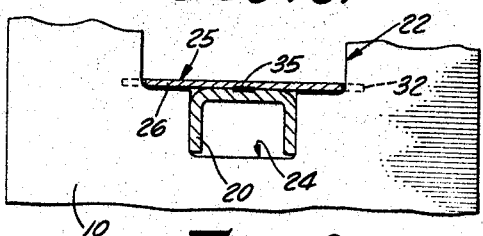
INVENTOR.
ARIEL C. BIGGS
BY
Reed C. Lawlor
ATTORNEY United States Patent Office 3,322,447
Patented May 30, 1967

3,322,447
STIFFENING-BAR MOUNTING FOR METAL WALL STUDS
Ariel C. Biggs, Whittier, Calif., assignor to Angeles Metal Trim Company, Los Angeles, Calif., a corporation of California
Filed Apr. 7, 1964, Ser. No. 358,008
10 Claims. (Cl. 287—189.36)

This invention relates to the mounting of stiffening bars in transverse or horizontal positions in vertical metal wall studs employed in building construction.

Metal wall studs of the indicated character are dimensioned so as to be used as substitutes for conventional wooden 2 x 4's. Such metal studs are in general channel shaped and are produced from galvanized steel sheeting of light gauge and possessing appreciable yieldability. Ordinarily, such studs, when arranged in conventional vertical relationship are braced by traverse stiffening bars which usually are in the form of heavier gauge channel-irons. Such channel-irons are passed through vertically spaced openings in the metal stud, and side portions thereof are welded to edge portions of the openings. Such welding of edge portions to faces of the bars generally results in irregular welding jobs and, in any event, is awkward, time-consuming, and unsatisfactory.

It is therefore an object of this invention to provide means for anchoring transverse stiffening-bars in openings formed in metal studs so that such welding as is required in each position may be accomplished very simply, as through a single spot-weld.

Another object of the invention is to employ as an anchoring means, at each weld position, a convenient anchor plate which is a piece struck out or punched out from the main wall of the stud when forming the respective opening through which the stiffening bar is to be passed.

A still further object is to shape the struck-out anchor plate to leave an opening for properly receiving a transverse stiffening bar, to engage the opening for anchoring the stiffening bar, and to be welded to the stiffening bar by a simple weld for fixing the bar in the vertical metal stud.

Other objects of the invention and features of construction will become apparent to those skilled in this art upon reference to the following specifications and the accompanying drawing wherein:

FIGURE 1 is an isometric perspective view showing two stiffening bars transversely disposed in three vertically arranged metal studs and anchored therein in accordance with this invention;

FIG. 2 is a cross-sectional view as indicated by the line 2—2 of FIG. 1;

FIG. 3 is an elevational view taken at the location of the line 2—2 as indicated by the line 3—3 of FIG. 1;

FIG. 4 is a perspective view of one of the struck-out or punched-out anchoring plates to be used for the present mounting and positioning purpose;

FIG. 5 is a perspective view of a somewhat modified form of anchor-plate indicated in operative relation to a stiffening bar of which a portion is indicated in phantom; and FIG. 6 is a sectional view indicating a position of the plate and bar of FIG. 5 in use in a metal stud.

Three typical upstanding metal studs 10 positioned with relation to each other in accordance with present improvement are illustrated in FIG. 1. Each stud 10 is provided with right-angularly bent flanges 12 extending longitudinally thereof and in turn having overhanging inwardly directed narrow flange portions 14. This construction provides each stud 10 with a longitudinally vertically extending channel 15.

As illustrated, the vertical exposed metal studs 10 are rigidly positioned with respect to each other, through the medium of a plurality of vertically spaced transverse stiffening bars 20, these bars extending through corresponding openings 22 struck out in vertically-spaced relationship in each of the main walls or webs of the metal studs 10. These openings 22 are disposed on vertical axes and their spacing is arranged on a suitable standard basis, such as two feet from opening to opening.

For the purpose of anchoring each transverse stiffening bar 20 in respective openings 22, use is made of metal pieces 25 struck out from the studs 10 when producing the openings 22. Each anchor piece 25 is symmetrical along its longitudinal axis and comprises a rectangular body section 26 having short rectangular extensions 28 at its ends. These end portions 28 of the anchor pieces thus leave portions 24 at the ends of the openings 22. Such opening portions 24 have widths which are approximately the width of the channel-irons forming the stiffening bars 20, and the depths of such opening portions 24 are approximately the depths of the channel-bars 20. Thus when the channeled stiffening bars 20 are moved into position in a horizontal series of openings 22 through a corresponding series of vertical metal studs 10, the stiffening bars 20 may be easily passed from the larger portions of the openings 22 down into the smaller end opening portions 24.

For the purpose of employing the punch-out or struck-out pieces 25 as anchoring plates, the body portions 26 of the plates 25 are made somewhat longer than wide. After each plate piece 25 has been struck out, short slots or kerfs 30 are formed along one edge of each of the end portions 28 so that ears or corner portions 32 result alongside the kerfs 30 to abut face portions of the main stud wall. With this arrangement, the distance between the inner ends of the kerfs 30 closely approximates the width of the larger portion of a corresponding opening 22 in a stud 10. With this arrangement, each anchoring plate 25 may be disposed crosswise of an opening 22 in the relationship indicated especially in FIGS. 2 and 3, with the result that the ears 32 lock behind the corresponding wall portions of the main wall or web of the respective metal stud 10. With each of the anchoring plates 25 arranged in its respective opening 22 as just indicated, and as seen especially in FIG. 2, such plate 25 is easily spot-welded to the top of the respective stiffening-bar 20 as indicated at 35. By the means thus constituted by the plurality of welded anchoring plates 25, each stiffening bar 20 is securely anchored. Thus, each anchoring plate is disposed on its stiffening bar 20 in a plane which is perpendicular to the longitudinal axis of the respective wall stud 10, and such plate lies crosswise of the respective opening 22 without substantially obstructing such opening. While it is possible to tip each stiffening bar 20 and its respective anchoring plates 25 in the openings 22, if desired, this nevertheless does not detract from the relatively rigid securing of the stiffening bars 20 to the various upstanding metal studs 10 which are thereby fixed in their relative positions.

In FIGS. 5 and 6, there is indicated a use of a slightly modified anchor plate 25 in a position lower than that of FIG. 3. Here, the plate 25 is spot-welded at 45 to the channel bar 20 (partly shown in phantom) along their longitudinal axes, and the bar 20 is inverted to place the plate 25 at the bottom of the corresponding smaller opening portion 24. To accomplish this positioning, instead of using the kerfs 30 of the other form, kerfs or slots 46 are cut at the sides of the body portion 26 so that the portion 48 intervening between inner ends of the kerfs 46 may drop into the bottom of the opening portion 24. The kerfs 46 thus receive adjacent corner portions 50 of the main wall of the stud 10 at the sides of the respective opening portion 24, and such corner portions 50 are in turn abutted by adjacent corner portions 52 of the anchor plate 25. Here, the upwardly directed channel 15 may be used to receive conduit, cable or the like.

Since other variations may be made within the spirit of the invention, it is intended that they shall be covered by the claims.

The invention claimed is:

1. In combination:
   a metal wall stud provided with a main wall having an opening therein;
   an anchor plate struck-out at said opening; and
   a stiffening bar received in said opening, said anchor plate fixed to said bar and located in and spanning said opening in contact with said stud and thereby anchoring said bar to said stud; said anchor plate having kerfs cut into edge portions thereof and receiving edge portions of the wall stud to bind the plate and stud together.

2. A combination as in claim 1 wherein said opening is elongated and provides a portion whose width approximates the width of said anchor plate.

3. A combination as in claim 1 wherein said opening is of the same shape as and is slightly larger than said struck-out anchor plate.

4. A combination as in claim 1 wherein the anchor plate is spot welded to the stiffening bar.

5. A combination as in claim 1 wherein said kerfs oppose each other and the distance between their ends approximates the width of a portion of said opening.

6. A combination as in claim 5 wherein said opening is elongated and provides a portion whose width approximates the width of said anchor plate.

7. In combination:
   a metal wall stud having a main wall provided with an opening therein;
   a stiffening bar received in said opening; and
   an anchor plate fixed on said bar and received in said opening in anchoring relation; said anchor plate being provided with a kerf at an edge thereof receiving and holding a portion of said wall at a side of said opening.

8. A combination as in claim 7 where said anchor plate frictionally binds said wall at edge portions of said opening.

9. A combination as in claim 7 wherein the anchor plate is longer than the width of said opening and edge portions of the plate frictionally engage edge portions of said wall at said opening in retaining engagement therewith.

10. A combination as in claim 7 wherein portions of said fixed plate abut portions of said main wall in retention relation.

References Cited

UNITED STATES PATENTS

| | | |
|---|---|---|
| 1,136,087 | 4/1915 | Bayley. |
| 2,090,884 | 8/1937 | Bayley _____ 189—36 X |
| 2,591,346 | 4/1952 | Fitzgerald _____ 189—36 |

DAVID J. WILLIAMOWSKY, *Primary Examiner.*

HARRISON R. MOSELEY, *Examiner.*

P. C. KANNAN, *Assistant Examiner.*